US012676890B2

(12) United States Patent
Lande Blau et al.

(10) Patent No.: US 12,676,890 B2
(45) Date of Patent: Jul. 7, 2026

(54) TECHNIQUES FOR CONTEXTUALLY APPLYING A SECURITY POLICY ON A SOFTWARE CONTAINER

(71) Applicant: Wiz, Inc., New York, NY (US)

(72) Inventors: Amir Lande Blau, Tel Aviv (IL); Roy Reznik, Tel Aviv (IL); Bar Magnezi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 332 days.

(21) Appl. No.: 18/333,052

(22) Filed: Jun. 12, 2023

(65) Prior Publication Data

US 2024/0414203 A1     Dec. 12, 2024

(51) Int. Cl.
 *H04L 9/40* (2022.01)
 *G06F 9/455* (2018.01)
(52) U.S. Cl.
 CPC .......... *H04L 63/20* (2013.01); *G06F 9/45558* (2013.01); *H04L 63/0272* (2013.01); *G06F 2009/45587* (2013.01)
(58) Field of Classification Search
 CPC . H04L 63/20; H04L 63/0227; H04L 63/0272; G06F 9/45558; G06F 2009/45587
 See application file for complete search history.

(56) References Cited

U.S. PATENT DOCUMENTS

| | | | |
|---|---|---|---|
| 8,291,468 B1 | 10/2012 | Chickering | |
| 10,116,670 B2 | 10/2018 | Muddu et al. | |
| 10,154,065 B1 * | 12/2018 | Buchler | G06F 21/6218 |
| 10,484,334 B1 * | 11/2019 | Lee | H04L 67/30 |
| 11,411,958 B2 | 8/2022 | Pularikkal et al. | |
| 11,601,512 B2 | 3/2023 | Xiao et al. | |
| 12,003,543 B1 * | 6/2024 | Ali | G06F 9/547 |
| 2019/0156023 A1 * | 5/2019 | Gerebe | G06F 21/51 |
| 2022/0247761 A1 * | 8/2022 | Subbanna | H04L 63/20 |
| 2023/0015603 A1 * | 1/2023 | Smith | H04L 63/1425 |
| 2023/0388352 A1 * | 11/2023 | Gilad | H04L 63/1416 |
| 2024/0241944 A1 * | 7/2024 | Smith | G06N 7/01 |
| 2024/0403437 A1 * | 12/2024 | Szigeti | G06F 21/577 |
| 2024/0427899 A1 * | 12/2024 | Hulick, Jr. | G06F 21/577 |

* cited by examiner

*Primary Examiner* — Frantz B Jean
(74) *Attorney, Agent, or Firm* — M&B IP Analysts, LLC

(57) ABSTRACT

A system and method for applying a cybersecurity contextual policy in a computing environment are disclosed. In an embodiment, the method includes: detecting a cybersecurity object on a virtualization, the virtualization deployed in a computing environment; detecting a policy of the computing environment, the policy including a conditional rule; generating a contextual policy based on: the conditional rule, and an exception to the conditional rule based on the cybersecurity object; and configuring an admission controller of a software container cluster deployed in the computing environment to apply the contextual policy.

19 Claims, 5 Drawing Sheets

SERVERLESS
FUNCTION
236

CLUSTER
232

VIRTUAL
MACHINE
234

230

220

CLUSTER
222

INFRASTRUCTURE AS CODE

240

UNIFIED POLICY ENGINE

210

TECHNIQUES FOR CONTEXTUALLY APPLYING A SECURITY POLICY ON A SOFTWARE CONTAINER

TECHNICAL FIELD

The present disclosure relates generally to cybersecurity of software containers, and specifically to applying contextual policies utilizing an admission controller in a software container.

BACKGROUND

Cloud computing environments often include a multitude of different technologies. For example, a single cloud computing environment can include virtual machines, serverless functions, and software containers. Each of these virtualizations can be deployed using different technology platforms, such as Oracle® VirtualBox for virtual machines, Amazon® Lambda for serverless functions, and Kubernetes® for deploying software containers, just to name a few.

Adding to this complication, each of these technologies can be deployed on different cloud computing infrastructures, such as Amazon® Web Service (AWS), Microsoft® Azure, Google® Cloud Platform (GCP), and others.

Often, an organization will use multiple cloud computing environments, such as virtual private clouds (VPCs), virtual networks (VNets), and the like, across different cloud computing infrastructures, and deploy various virtualizations throughout. Furthermore, a cloud computing environment is often duplicated, mirrored, and the like, to provide various functionalities. For example, an organization may have a production environment in which virtualizations provide services, provision resources, and the like, and a testing environment, a development environment, a staging environment, and the like.

Typically, the various environments provide some sort of mirroring of each other, for example, a virtualization is developed in a development environment, then deployed in a staging environment which is identical, or nearly identical, to the production environment, in order to test the virtualization in a "real-world" setting, but without compromising the production environment.

All these factors together make for a complicated cybersecurity arena. Each such environment has a potential for exposure and attack, and policies are utilized to limit, or otherwise restrict, access to various resources of each environment. However, having policies, rules, and the like, in place for each different computing environment is complicated and provides many opportunities for issues to remain unresolved and slip through the cracks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a cybersecurity object on a virtualization, the virtualization deployed in a computing environment. Method may also include detecting a policy of the computing environment, the policy including a conditional rule. Method may furthermore include generating a contextual policy based on: the conditional rule, and an exception to the conditional rule based on the cybersecurity object. Method may in addition include configuring an admission controller of a software container cluster deployed in the computing environment to apply the contextual policy. Other embodiments of this aspect include corresponding computer systems, apparatus, and computer programs recorded on one or more computer storage devices, each configured to perform the actions of the methods.

Implementations may include one or more of the following features. Method may include: configuring the admission controller to apply the contextual policy on a plurality of software containers deployed in the software container cluster. Method may include: applying the policy to a code object, where the code object is utilized to deploy the virtualization. Method where the conditional rule is any one of: an exclusionary rule, or an inclusionary rule. Method may include: detecting a virtualization deployed in the computing environment which is an exception to the conditional rule; and generating the exception based on a parameter of the detected virtualization. Method may include: intercepting a request from a software container to an application programming interface (API); and applying the contextual policy to the request. Method may include: configuring a webhook in the software container cluster to intercept requests from a container of a first node; and configuring the webhook to send the intercepted requests to the admission controller. Method may include: configuring a second admission controller of a second software container cluster deployed in a second computing environment to apply the contextual policy, where the second computing environment is deployed on a cloud computing infrastructure which is different than a cloud computing infrastructure on which the cloud computing environment is deployed. Method where the admission controller is any one of: a validating admission controller, a mutating admission controller, and a combination thereof. Implementations of the described techniques may include hardware, a method or process, or a computer tangible medium.

In one general aspect, non-transitory computer-readable medium may include one or more instructions that, when executed by one or more processors of a device, cause the device to: detect a cybersecurity object on a virtualization, the virtualization deployed in a computing environment. Medium may furthermore include one or more instructions that, when executed by one or more processors of a device, cause the device to detect a policy of the computing environment, the policy including a conditional rule. Medium may in addition include one or more instructions that, when executed by one or more processors of a device, cause the device to generate a contextual policy based on: the conditional rule, and an exception to the conditional rule based on the cybersecurity object. Medium may moreover include configure an admission controller of a software container cluster deployed in the computing environment to apply the contextual policy. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a cybersecurity object on a virtualization, the virtualization deployed in a computing environment. System may in addition include detect a policy of the computing environment, the policy including a conditional rule. System may moreover include generate a contextual policy based on: the conditional rule, and an exception to the conditional rule based on the cybersecurity object. System may also include configure an admission controller of a software container cluster deployed in the computing environment to apply the contextual policy. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure the admission controller to apply the contextual policy on a plurality of software containers deployed in the software container cluster. System where the memory contains further instructions which when executed by the processing circuitry further configure the system to: apply the policy to a code object, where the code object is utilized to deploy the virtualization. System where the conditional rule is any one of: an exclusionary rule, or an inclusionary rule. System where the memory contains further instructions which when executed by the processing circuitry further configure the system to: detect a virtualization deployed in the computing environment which is an exception to the conditional rule; and generate the exception based on a parameter of the detected virtualization. System where the memory contains further instructions which when executed by the processing circuitry further configure the system to: intercept a request from a software container to an application programming interface (API); and apply the contextual policy to the request. System where the memory contains further instructions which when executed by the processing circuitry further configure the system to: configure a webhook in the software container cluster to intercept requests from a container of a first node; and configure the webhook to send the intercepted requests to the admission controller. System where the memory contains further instructions which when executed by the processing circuitry further configure the system to: configure a second admission controller of a second software container cluster deployed in a second computing environment to apply the contextual policy, where the second computing environment is deployed on a cloud computing infrastructure which is different than a cloud computing infrastructure on which the cloud computing environment is deployed. System where the admission controller is any one of: a validating admission controller, a mutating admission controller, and a combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
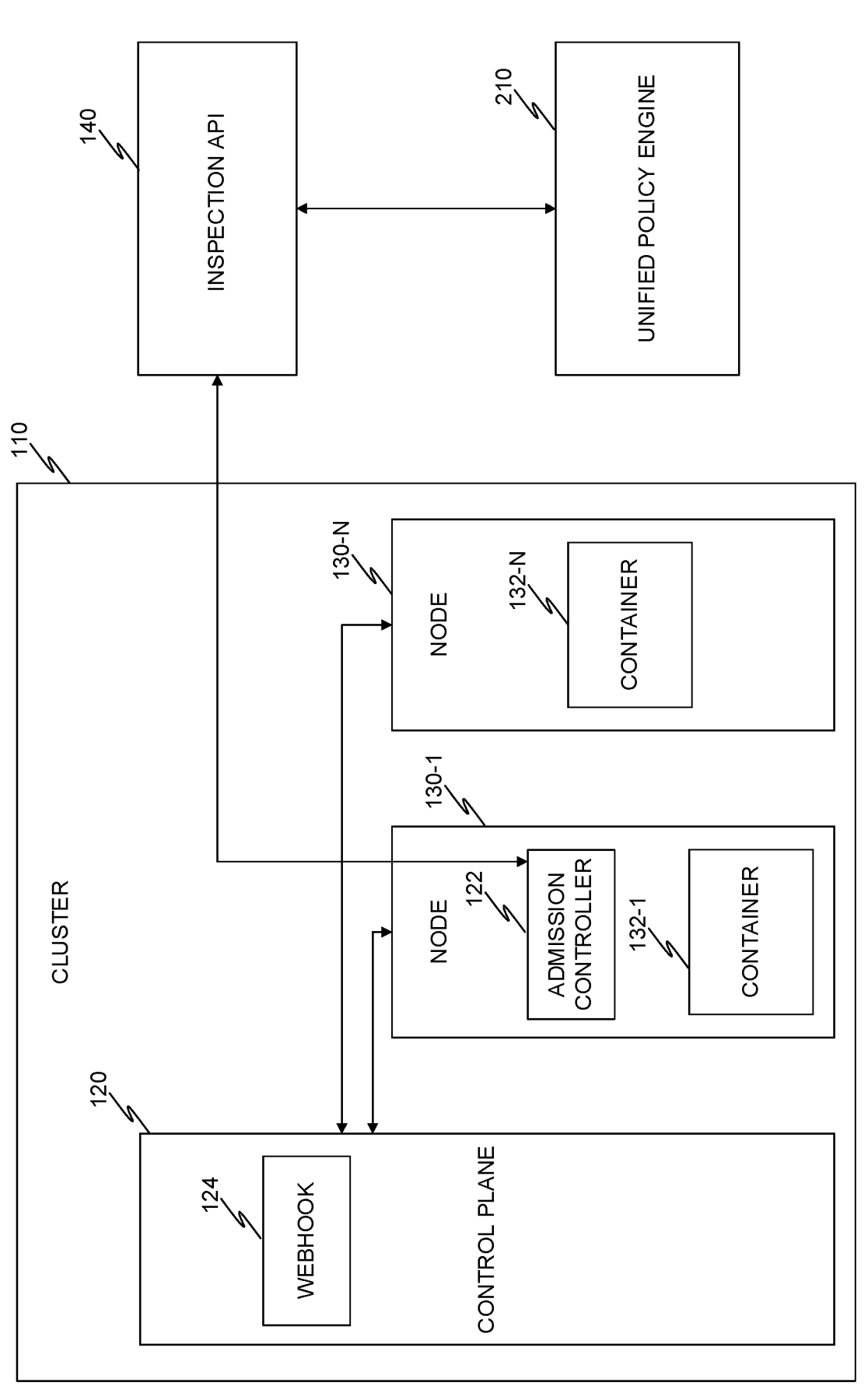
FIG. 1 is an example of a schematic of a software container cluster having an admission controller for policy implementation, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for applying a policy from a unified policy engine in a plurality of computing environments. In an embodiment, a computing environment is a network of computers, a cloud computing environment, a hybrid computing environment, a combination thereof, and the like. Applying a single policy to multiple computing environments is advantageous, as an organization which utilizes multiple computing environments is therefore required to maintain a single point containing policies for the entire organization, regardless of a specific computing environment in use.

This is especially useful, for example, where an organization utilizes multiple computing environments such as a staging environment, a testing environment, an infrastructure as code environment, any combination thereof, and the like. In some embodiments, an organization further utilizes such environments across different cloud computing infrastructures, e.g., Amazon® Web Services (AWS), Google® Cloud Platform (GCP), Microsoft® Azure, and the like. Thus an organization utilizes a first environment (e.g., first staging environment) in a first cloud computing infrastructure (e.g., AWS), and a second environment (e.g., second staging environment) in a second cloud computing infrastructure (e.g., GCP). Utilizing a unified policy engine allows reduced storage, as there is no need to retain multiple copies of policies in different computing environments, and reduces the need to ascertain that all computing environments of an organization utilize the same policies across all computing environments, according to an embodiment.

For example, the first environment and the second environment would each require a policy engine, each policy engine having copies of policies stored on the other. Therefore, where a change, such as an exception, is introduced to a policy in the first environment, a corresponding change would have to be introduced to a corresponding policy in the second environment.

In this regard, it is recognized that applying a policy and changing policies are activities that can be performed by a human. However, cybersecurity policies, in order to be effective, need to be applied in a manner which is consistent, objective, and equal across multiple computing environments, and in a timely manner as any time window where policies are not aligned between computing environments potentially results in an exposure of that environment.

A human, therefore, is incapable of applying policies, and applying changes to policies, across multiple computing environments, or indeed any computing environments, in a manner which is timely, consistent, objective, and equal. This is because the human mind inherently applies conditions subjectively, whereas the disclosed system utilizes an objective admission controller.

According to an embodiment, a software container cluster includes an admission controller which is configured to receive a policy from a unified policy engine, and apply the policy to all containers, nodes, pods, combinations thereof, and the like, deployed in a software container cluster.

FIG. 1 is an example of a schematic of a software container cluster having an admission controller for policy implementation, utilized to describe an embodiment. In an embodiment, a container cluster 110 is deployed on a computer system, such as described in more detail in FIG. 4 below.

In some embodiments, a software container cluster 110 is implemented utilizing a Kubernetes® platform, a Docker® Engine, and the like. In certain embodiments, a software container cluster 110 is configured to deploy a plurality of software containers. In an embodiment, a software container is a containerized software application.

In certain embodiments, a container cluster 110 includes a control plane 120 configured to communicate with an inspection application programming interface (API) 140, and a plurality of nodes 130-1 through 130-N, where 'N' is an integer having a value of '2' or greater, individually referred to as node 130 and collectively referred to as nodes 130.

In an embodiment, the control plane 120 is implemented on a single machine in the cluster. In some embodiments, the machine on which the control plane 120 is implemented only executes components of the control plane 120. For example, in an embodiment, the machine does not include a container based on a user-generated image, base image, and the like.

For example, in some embodiments, a Kubernetes container cluster control plane 120 includes components such as an API server, a key value store, a scheduler, a controller, and the like. In an embodiment, the API server is implemented as a kube-apiserver, which is configured to expose the Kubernetes API to external resources. In certain embodiments, the key value store is configured to store key values, cluster data, and the like.

In some embodiments, the controller includes a node controller, a job controller, a service account controller, and the like. In certain embodiments, the control plane 120 includes a webhook 124. In an embodiment, the webhook 124 is a validating webhook, a mutating webhook, and the like. In an embodiment, a webhook 124 is configured to detect a request to an API, to another node in the cluster, and the like. In certain embodiments, the webhook 124 is further configured to send the request to an admission controller 122. In an embodiment, the cluster 110 includes a plurality of nodes 130-1 through 130-N.

In certain embodiments, each node 130 includes a container 132. In some embodiments, the container 132 includes a containerized software application. In certain embodiments, a node 130 includes a plurality of containers, an agent, a network proxy, a combination thereof, and the like. In an embodiment, a containerized software application includes a software, dependencies of the software, a combination thereof, and the like.

In certain embodiments, an inspection API 140 is configured to expose resources, communication, and the like, with a cloud computing environment. For example, in an embodiment, a cloud computing environment is a virtual private cloud (VPC), a virtual network (VNet), and the like, deployed on a cloud computing infrastructure. In an embodiment, a cloud computing infrastructure is Amazon® Web Services (AWS), Google® Cloud Platform (GCP), Microsoft® Azure, and the like. In certain embodiments, the control plane 120 of the cluster 110 is configured to communicate through the inspection API 140.

In some embodiments, an admission controller 122 is deployed on a node 130-1. In an embodiment, an admission controller 122 is configured to receive intercepted requests to the API server of the control plane 120. For example, in an embodiment, a software container 132-N is configured to communicate through a node 130-N to an API server of the control plane 120, which in turn is configured to communicate with the inspection API 140.

In certain embodiments, the admission controller 122 is implemented as computer software deployed on a node of the cluster 110. In some embodiments, the admission controller 122 is configured to communicate with a unified policy engine 210, for example through the inspection API 140.

In some embodiments, the admission controller 122 is configured to request a policy from the unified policy engine 120. In an embodiment, the admission controller 122 is configured to apply the received policy on a request intercepted from a container 132-1 of a node 130-1.

In some embodiments, a policy includes a conditional rule. For example, in an embodiment, a policy includes a conditional rule, utilized to check if a network communication is directed to an IP address which is on a list of banned IP addresses. In an embodiment, a request is generated by a software container 132-N to send a network message, the request including a destination address (e.g., an IP address). In an embodiment, the request is delivered from the node 130-N to the control plane 120, where the request is intercepted by the webhook 124. The request is sent to the admission controller 122, which is configured to apply a policy on the request.

In some embodiments, the admission controller 122 is configured to apply a policy to the request. For example, in an embodiment, the admission controller 122 is configured to apply a conditional rule such that if a communication is directed to an IP address stored in a list of blocked IP addresses, the communication is denied, and the request is not passed to the inspection API 140. In certain embodiments, the admission controller 122 is configured to apply a conditional rule such that if a communication is not directed to an IP address stored in a list of blocked IP addresses, the communication is allowed to pass through, and is forwarded, for example, to the inspection API 140.

In an embodiment, the admission controller 122 is configured to apply a conditional rule such that if a communication is directed to an IP address stored in a list of allowed IP addresses, the communication is allowed, and the request is passed to the inspection API 140. In some embodiments, the admission controller 122 is configured to apply a conditional rule such that if a communication is not directed to an IP address stored in a list of allowed IP addresses, the communication is denied, and the request is not passed to the inspection API 140.

Figure 2:
FIG. 2 is an example of a network diagram with multiple computing environments utilizing a unified policy engine, implemented according to an embodiment.

FIG. 2 is an example of a network diagram with multiple computing environments utilizing a unified policy engine, implemented according to an embodiment. In an embodiment, a unified policy engine 210 includes a rule, a policy, a combination thereof, and the like. In some embodiments, a rule includes a condition, for example such that when the condition is met an action is performed, when the condition is met an action is refrained from being performed, when a condition is not met an action is performed, when a condition is not met an action is refrained from being performed, combinations thereof, and the like.

In some embodiments, a unified policy engine 210 supplies rules, policies, and the like, to various computing environments. For example, in an embodiment, the unified policy engine supplies a rule to a first cloud computing environment 220, a second cloud computing environment 230, and an infrastructure as code (IaC) environment 240.

In an embodiment, a cloud computing environment is a virtual private cloud (VPC), a virtual network (VNET), and the like, implemented on a cloud computing infrastructure. According to an embodiment, a cloud computing infrastructure is, for example, Amazon® Web Services (AWS), Microsoft® Azure, Google® Cloud Platform (GCP), and the like.

In certain embodiments, an IaC environment 240 is utilized, for example, with Terraform®, Ansible®, Chef®, Puppet®, and the like.

In certain embodiments, security policies are maintained for different compute environments, for example in order to secure certain digital assets, prevent unwanted or unintended access, and the like. In some embodiments, for example where continuous integration and continuous deployment (CI/CD) is implemented, multiple compute environments are related. For example, according to an embodiment, declaratory code in an IaC environment 240 is utilized to deploy a software container cluster 222 in a staging environment 220.

In an embodiment, a staging environment is a cloud computing environment in which resources, principals, and the like, are deployed prior to being deployed in a production environment, such as production environment 230. This is beneficial as it allows to test and benchmark a resource, such as the container cluster 222 prior to deploying a counterpart to the container cluster 222 in the production environment 230. For example, in an embodiment, the counterpart to the container cluster 222 deployed in the staging environment 220 is the software container cluster 232 deployed in the production environment 230.

According to an embodiment, once a resource, such as the container cluster 222 passes a benchmark, test, and the like, code utilized to deploy the container cluster 222 in the staging environment 220 can be utilized to deploy the container luster 232 in the production environment 230. In some embodiments, it is beneficial to take action based on a code object, a resource deployed in a staging environment based on the code object, and a corresponding resource deployed in the production environment, wherein the action applies to each of the code object and two resources.

For example, in some embodiments, it is useful to employ a policy on a code object, on a resource deployed in a staging environment 220, and a corresponding resource deployed in a production environment 230, as all these correspond to each other. In certain embodiments, a policy is enacted based on observation of a resource, such as the container cluster 222, in a staging environment.

Utilizing a unified policy engine 210 allows to store a single policy utilized by each related computing environment. This is preferable to storing a corresponding policy in each computing environment, especially when these computing environments are related to each other. In an embodiment, utilizing a single unified policy engine 210 also reduces storage space required to store redundant similar policies, as it eliminates the need to store a corresponding policy in each different (yet related) computing environment.

Furthermore, configuring a software container cluster to deploy an admission controller which is configured to utilize policies from the unified policy engine 210 provides a level of assurance that a policy is enacted on each container in the cluster, and across multiple clusters in any computing environment. A single policy is therefore applied equally, objectively, and consistently. While it is recognized, for example, that a human can apply a condition to a resource, it is also recognized that a human is incapable of applying a condition (e.g., a policy) in a manner that is equal and objective in a consistent manner across multiple computing environments, and can certainly not do so within a timeframe that would make application of such a policy useful.

Figure 3:
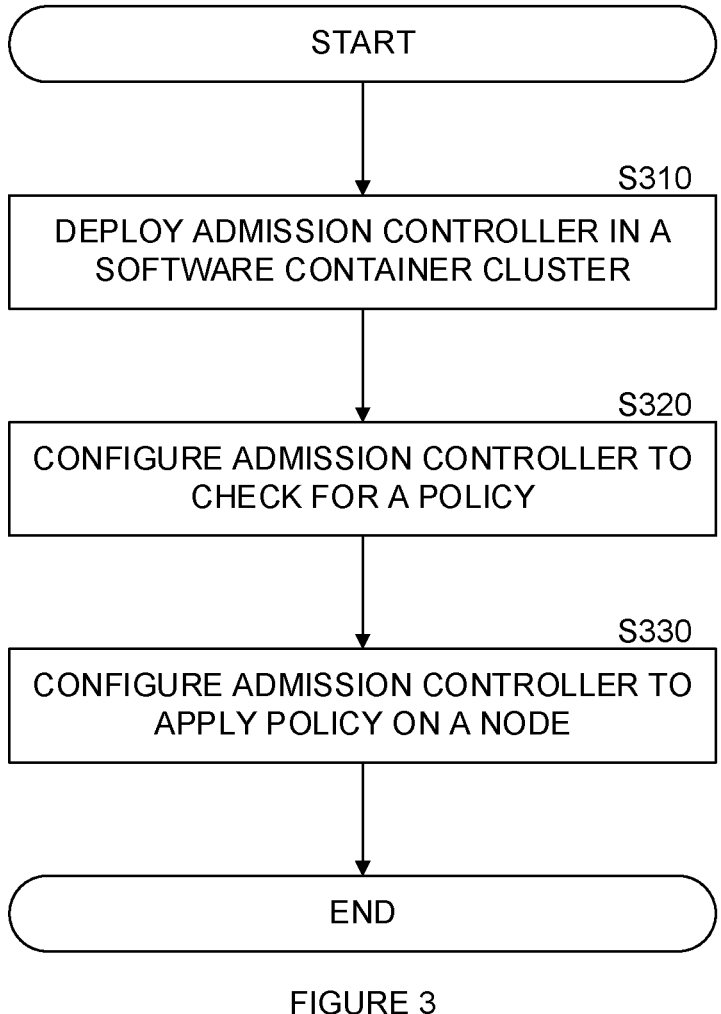
FIG. 3 is an example flowchart of a method for deploying a policy-enforcing admission controller for a software container, implemented in accordance with an embodiment.

FIG. 3 is an example flowchart of a method for deploying a policy-enforcing admission controller for a software container, implemented in accordance with an embodiment.

At S310, an admission controller is deployed. In some embodiments, a plurality of admission controllers are deployed. In an embodiment, the admission controller is deployed in a control plane of a software container cluster. In some embodiments, a software container cluster is implemented on a Kubernetes® platform.

In certain embodiments, the admission controller is configured to intercept API requests between a node in the container cluster and an inspection API of the container cluster. In an embodiment, the admission controller is configured as a mutating admission controller, a validating admission controller, a combination thereof, and the like. In certain embodiments, a plurality of admission controllers, including a mutating admission controller and a validating admission controller, are deployed.

In some embodiments, a mutating admission controller is configured to modify a request which is received by the admission controller. For example, in an embodiment, the admission controller is configured to modify a request based on a policy received from a unified policy engine.

In certain embodiments, a validating admission controller is configured to validate a request without changing the request itself. In certain embodiments, an admission controller is configured to validate a request which was modified by a mutating admission controller.

At S320, a check is performed for a policy. In an embodiment, an admission controller is configured to periodically check, for example by sending a request to a unified policy engine, to receive a new policy. In certain embodiments, the admission controller is configured to send to the unified policy engine a policy version number. In some embodiments, the unified policy engine is configured to compare a received policy version to a stored policy version, and send an admission controller the stored policy version in response to determining that the received version is older than the stored version.

At S330, the policy is applied. In an embodiment, the admission controller is configured to apply the policy, for example, on a container deployed in a node of the cluster where the admission controller is deployed. In certain embodiments, a plurality of policies are applied.

In some embodiments, an admission controller is configured to merge a plurality of policies, such as a first policy and a second policy, into a single policy, and apply the single policy to each container, pod, and the like, in the cluster. In certain embodiments, a policy is merged by extracting a conditional rule from a first policy, extracting a conditional rule from a second policy, and generating a new conditional rule, for example by adding a Boolean "AND" operator between the conditional rule of the first policy and the conditional rule of the second policy.

In some embodiments, a policy is applied each occurrence where a node, a pod, a container, and the like, access the control plane of the cluster. For example, in an embodiment, a policy is applied in response to detecting an instruction to deploy a node, a pod, a container, a combination thereof, and the like, in the cluster. In some embodiments, a policy is applied on a request originating from a node, a pod, a container, a combination thereof, and the like, such as a request to communicate with an IP address through an inspection API.

Figure 4:
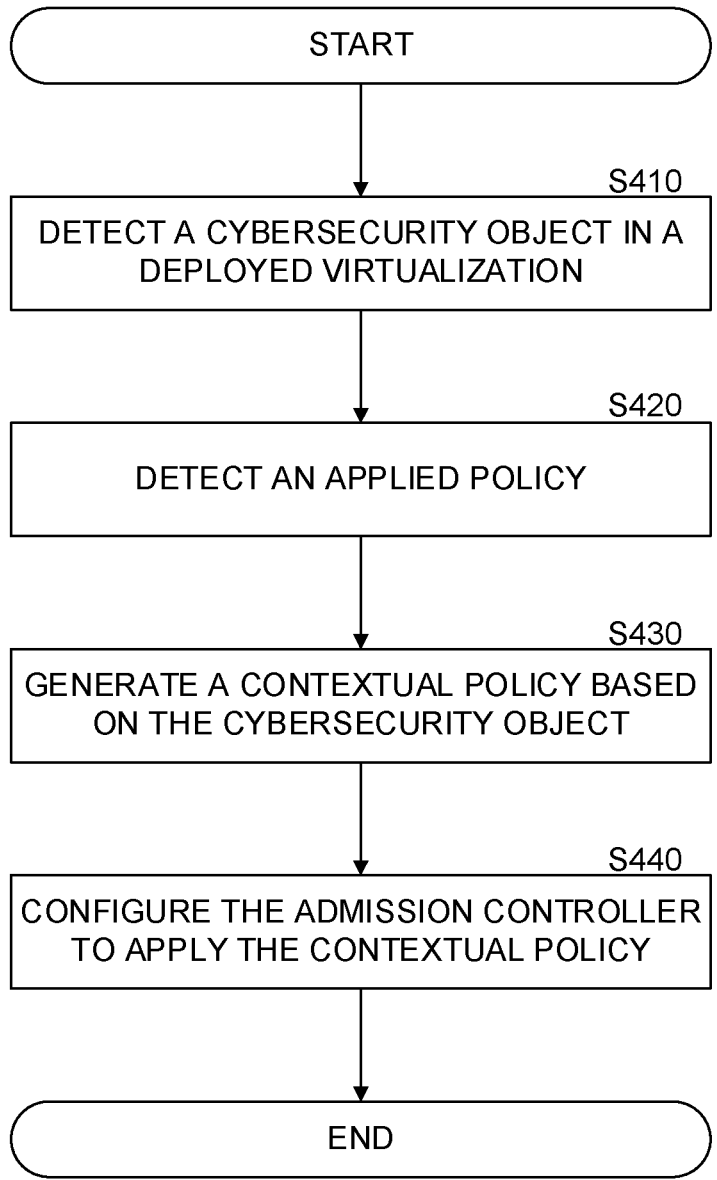
FIG. 4 is a flowchart of a method for generating a contextual policy in a computing environment, implemented in accordance with an embodiment.

FIG. 4 is a flowchart of a method for generating a contextual policy in a computing environment, implemented in accordance with an embodiment. In certain embodiments, a contextual policy is generated based on an existing policy, based on an exception to an existing policy, based on a detected cybersecurity object in a computing environment, combinations thereof, and the like.

In an embodiment, a contextual policy is a policy which is generated based on a context detected in a computing environment. For example, in some embodiments, a policy includes a condition that a cybersecurity object of a first type, such as a cleartext password, should not be stored on a deployed resource.

In an embodiment, a context is generated for a detected cybersecurity object. For example, in some embodiments, a first cleartext password provides a limited set of permissions in a cloud computing environment, while a second cleartext password provides administrator privilege in the cloud computing environment. In some embodiments, context is generated based on a security graph which stores therein a representation of a computing environment. For example, according to an embodiment, a node in the security graph represents a resource, a principal, a context, an enrichment, an endpoint, a combination thereof, and the like.

By determining the context of each cleartext password, according to an embodiment, it is possible to permit some workloads to deploy (e.g., workloads which contain a cleartext password with limited permissions) while denying deployment of other workloads (e.g., workloads which contain a cleartext password with administrator privileges).

In an embodiment, a security graph is generated by performing network discovery of a computing environment, and inspecting, scanning, and the like, each discovered resource in the computing environment for cybersecurity objects. In some embodiments, each discovered resource, cybersecurity object, and the like, is represented as a node in the security graph. In certain embodiments, principals are detected in the computing environment, such as a user account, a service account, a role, and the like. In some embodiments, an identity and access management service is accessed to determine a permission associated with a principal.

In some embodiments, a principal is a cloud entity which includes a permission, authorization, and the like, to act on a resource, initiate an action in the computing environment, a combination thereof, and the like.

In certain embodiments, a resource is a virtual machine, a software container, a serverless function, an application, a software as a service, an infrastructure as code platform, a provisioned hardware resource, a storage, a bucket in a cloud computing environment, a combination thereof, and the like.

At S410, a cybersecurity object is detected. In an embodiment, the cybersecurity object is detected on a deployed virtualization. A deployed virtualization is, according to an embodiment, a virtual machine, a software container, a serverless function, a combination thereof, and the like.

In some embodiments, a cybersecurity object is an operating system, a software application, a cleartext password, a plaintext password, an encryption key, a certificate, a misconfiguration, a vulnerability, an exposure, a combination thereof, and the like.

In an embodiment, the cybersecurity object is detected utilizing a scanner, an inspector, and the like. In certain embodiments, a representation of the cybersecurity object is stored on a security graph. In an embodiment, the security graph includes a representation of a computing environment, for example, by generating nodes which represent resources, principals, enrichments, and the like, detected in the computing environment.

In some embodiments, detection of resources, principals, and the like, is performed by utilizing network discovery. In an embodiment, a node representing a cybersecurity object is connected to a node representing a cloud entity (e.g., a resource, a principal, and the like). In some embodiments, the security graph is traversed to detect a node representing a resource, based on the cybersecurity object. For example, an identifier of the cybersecurity object is utilized to generate a query for the security graph.

At S420, a policy is detected. In an embodiment, the policy is applied to the computing environment in which the cybersecurity object is detected. In some embodiments, the policy is detected by extracting an identifier of the cybersecurity object, and matching the identifier to a policy. In an embodiment, matching the identifier to a policy is performed by querying an identity and access management service.

In some embodiments, a policy is detected based on an identifier of a resource on which the cybersecurity object is detected. For example, in an embodiment, data pertaining to the resource, metadata of the resource, and the like, is utilized to detect a policy. For example, in an embodiment, an identifier of a resource is utilized to detect a policy. In certain embodiments, a policy engine is queried with the identifier to detect a policy.

At S430, a contextual policy is generated. In an embodiment, a contextual policy is generated based on an applied policy and the cybersecurity object. In certain embodiments, a contextual policy is generated based on the applied policy and an exception generated based on the cybersecurity object. In some embodiments, the applied policy includes a rule, such that the contextual policy includes the rule which is applied other than in instances where the exception is true (e.g., a condition of the exception is true).

In certain embodiments, the exception is exclusionary, while in other embodiments the exception is inclusionary. According to an embodiment, an exception is exclusionary where the applied policy is applied to all instances, other than instances where a condition of the exception is true.

In some embodiments, the exception is inclusionary, such that the exception is applied to some instances, and applied to another instance to which the applied policy would not apply if not for the exception condition.

For example, in an embodiment, a rule includes a condition that no container can be deployed with a cleartext password (a cybersecurity object). In an embodiment, a first cleartext password provides administrator privileges, while a second cleartext password provides limited privileges. Therefore, a contextual policy is generated based on the rule (e.g., no container deployed with a cleartext password) and an exception (e.g., cleartext passwords with limited privilege).

In an embodiment, the second cleartext password is detected on a deployed workload. In some embodiments, a security graph, identity and access management service, and the like, is queried to determine a permission associated with the second cleartext password. In an embodiment, where the second cleartext password is associated with limited permissions (i.e., not administrator permissions), an exception is generated to the policy rule which states that no container can be deployed with a cleartext password.

At S440, an admission controller is configured to apply the contextual policy. In an embodiment, the admission controller is configured to periodically request policies, rules, exceptions, and the like. In some embodiments, the admission controller applies the contextual rule prior to deploying a software container in the software container cluster. In certain embodiments, the admission controller is configured to apply the contextual rule to each request sent to a software container in the software container cluster. In an embodiment, the admission controller is configured to apply the contextual tule to each communication directed to a software container in the software container cluster.

In some embodiments, the contextual policy is generated by a unified policy engine, and sent from the unified policy engine to each of a plurality of admission controllers, each admission controller deployed in a software container cluster of a plurality of software container clusters. In certain embodiments, each software container cluster of the plurality of software container clusters is deployed in a different cloud computing environment. In an embodiment, each cloud computing environment is deployed on a different cloud computing infrastructure.

For example, according to an embodiment a first software container cluster is deployed in a first cloud computing environment (e.g., a virtual private cloud-VPC), the first cloud computing environment deployed on Amazon® Web Services (AWS), and a second software container cluster is deployed in a second cloud computing environment (e.g., a virtual network-VNet), the second cloud computing environment deployed on Microsoft® Azure.

Figure 5:
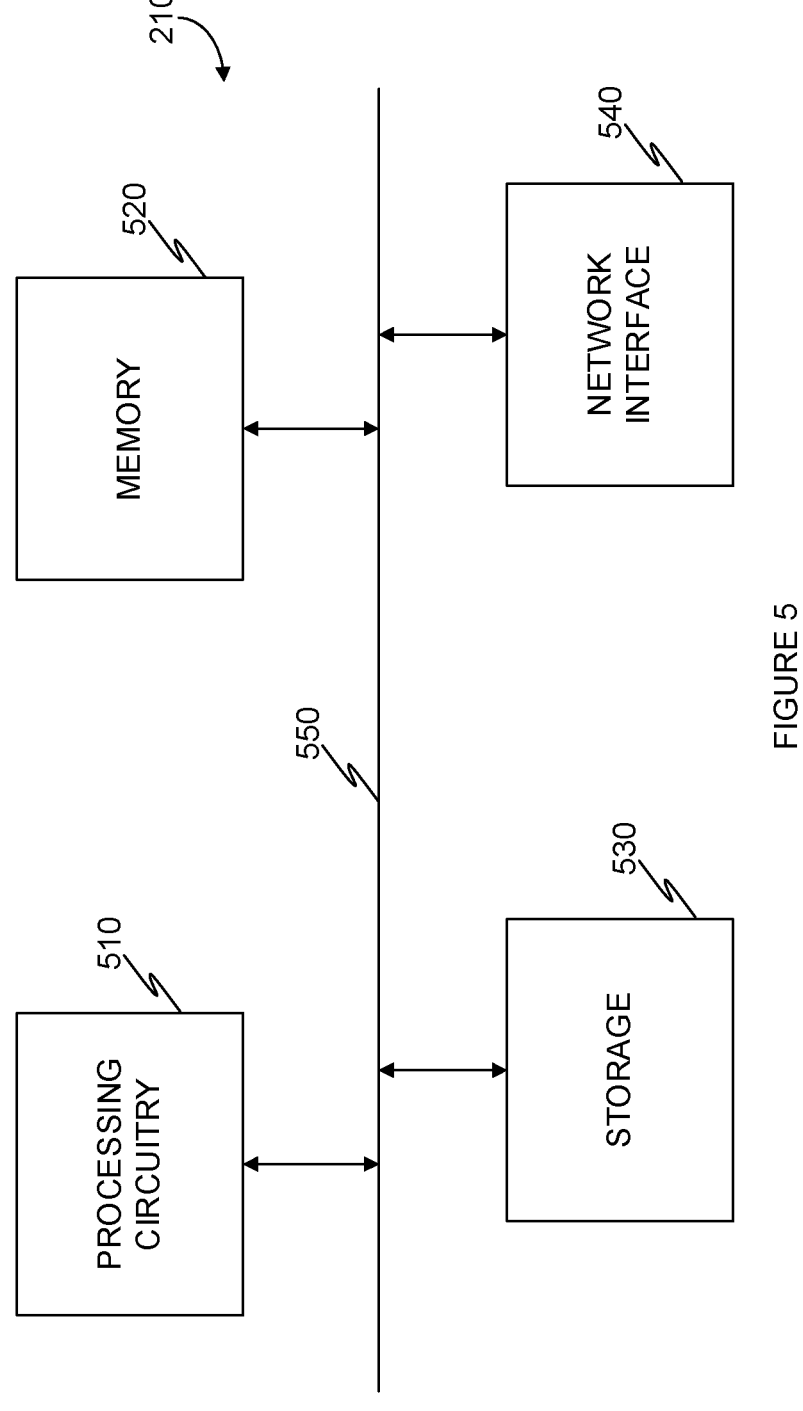
FIG. 5 is an example schematic diagram of a unified policy engine according to an embodiment.

FIG. 5 is an example schematic diagram of a unified policy engine 210 according to an embodiment. The unified policy engine 210 includes a processing circuitry 510 coupled to a memory 520, a storage 530, and a network interface 540. In an embodiment, the components of the unified policy engine 210 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the unified policy engine 210 with communication with, for example, the cloud API 140, the software container cluster 110, and the like.

It should be understood that the embodiments described herein are not limited to the specific architecture illustrated in FIG. 5, and other architectures may be equally used without departing from the scope of the disclosed embodiments.

Furthermore, in certain embodiments the software container cluster 110 may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for applying a cybersecurity contextual policy in a computing environment, comprising:
detecting a cybersecurity object on a virtualization, the virtualization deployed in a computing environment;
detecting a policy of the computing environment, the policy including a conditional rule;
generating a contextual policy based on: the conditional rule, and an exception to the conditional rule based on the cybersecurity object; and
configuring an admission controller of a software container cluster deployed in the computing environment to apply the contextual policy.

2. The method of claim 1, further comprising:
configuring the admission controller to apply the contextual policy on a plurality of software containers deployed in the software container cluster.

3. The method of claim 1, further comprising:
applying the policy to a code object, wherein the code object is utilized to deploy the virtualization.

4. The method of claim 1, wherein the conditional rule is any one of: an exclusionary rule, or an inclusionary rule.

5. The method of claim 1, further comprising:
detecting a virtualization deployed in the computing environment which is an exception to the conditional rule; and
generating the exception based on a parameter of the detected virtualization.

6. The method of claim 1, further comprising:
intercepting a request from a software container to an application programming interface (API); and
applying the contextual policy to the request.

7. The method of claim 6, further comprising:
configuring a webhook in the software container cluster to intercept requests from a container of a first node; and
configuring the webhook to send the intercepted requests to the admission controller.

8. The method of claim 1, further comprising:
configuring a second admission controller of a second software container cluster deployed in a second computing environment to apply the contextual policy, wherein the second computing environment is deployed on a cloud computing infrastructure which is different than a cloud computing infrastructure on which the cloud computing environment is deployed.

9. The method of claim 1, wherein the admission controller is any one of: a validating admission controller, a mutating admission controller, and a combination thereof.

10. A non-transitory computer-readable medium storing a set of instructions for applying a cybersecurity contextual policy in a computing environment, the set of instructions comprising:
one or more instructions that, when executed by one or more processors of a device, cause the device to:
detect a cybersecurity object on a virtualization, the virtualization deployed in a computing environment;
detect a policy of the computing environment, the policy including a conditional rule;
generate a contextual policy based on: the conditional rule, and an exception to the conditional rule based on the cybersecurity object; and
configure an admission controller of a software container cluster deployed in the computing environment to apply the contextual policy.

11. A system for applying a cybersecurity contextual policy in a computing environment, comprising:
a processing circuitry; and
a memory, the memory containing instructions that, when executed by the processing circuitry, configure the system to:
detect a cybersecurity object on a virtualization, the virtualization deployed in a computing environment;
detect a policy of the computing environment, the policy including a conditional rule;
generate a contextual policy based on: the conditional rule, and an exception to the conditional rule based on the cybersecurity object; and
configure an admission controller of a software container cluster deployed in the computing environment to apply the contextual policy.

12. The system of claim 11, wherein the memory contains further instructions which when executed by the processing circuitry further configure the system to:
configure the admission controller to apply the contextual policy on a plurality of software containers deployed in the software container cluster.

13. The system of claim 11, wherein the memory contains further instructions which when executed by the processing circuitry further configure the system to:
apply the policy to a code object, wherein the code object is utilized to deploy the virtualization.

14. The system of claim 11, wherein the conditional rule is any one of: an exclusionary rule, or an inclusionary rule.

15. The system of claim 11, wherein the memory contains further instructions which when executed by the processing circuitry further configure the system to:

detect a virtualization deployed in the computing environment which is an exception to the conditional rule; and generate the exception based on a parameter of the detected virtualization.

16. The system of claim 11, wherein the memory contains further instructions which when executed by the processing circuitry further configure the system to:

intercept a request from a software container to an application programming interface (API); and apply the contextual policy to the request.

17. The system of claim 16, wherein the memory contains further instructions which when executed by the processing circuitry further configure the system to:

configure a webhook in the software container cluster to intercept requests from a container of a first node; and configure the webhook to send the intercepted requests to the admission controller.

18. The system of claim 11, wherein the memory contains further instructions which when executed by the processing circuitry further configure the system to:

configure a second admission controller of a second software container cluster deployed in a second computing environment to apply the contextual policy, wherein the second computing environment is deployed on a cloud computing infrastructure which is different than a cloud computing infrastructure on which the cloud computing environment is deployed.

19. The system of claim 11, wherein the admission controller is any one of:

a validating admission controller, a mutating admission controller, and a combination thereof.

\* \* \* \* \*